July 17, 1934.   L. A. DUMSER   1,966,888
MACHINE TOOL
Filed March 5, 1931   2 Sheets-Sheet 1

Inventor.
Leo A. Dumser,
Axel A. Hofgren
Atty.

July 17, 1934.  L. A. DUMSER  1,966,888
MACHINE TOOL
Filed March 5, 1931  2 Sheets-Sheet 2
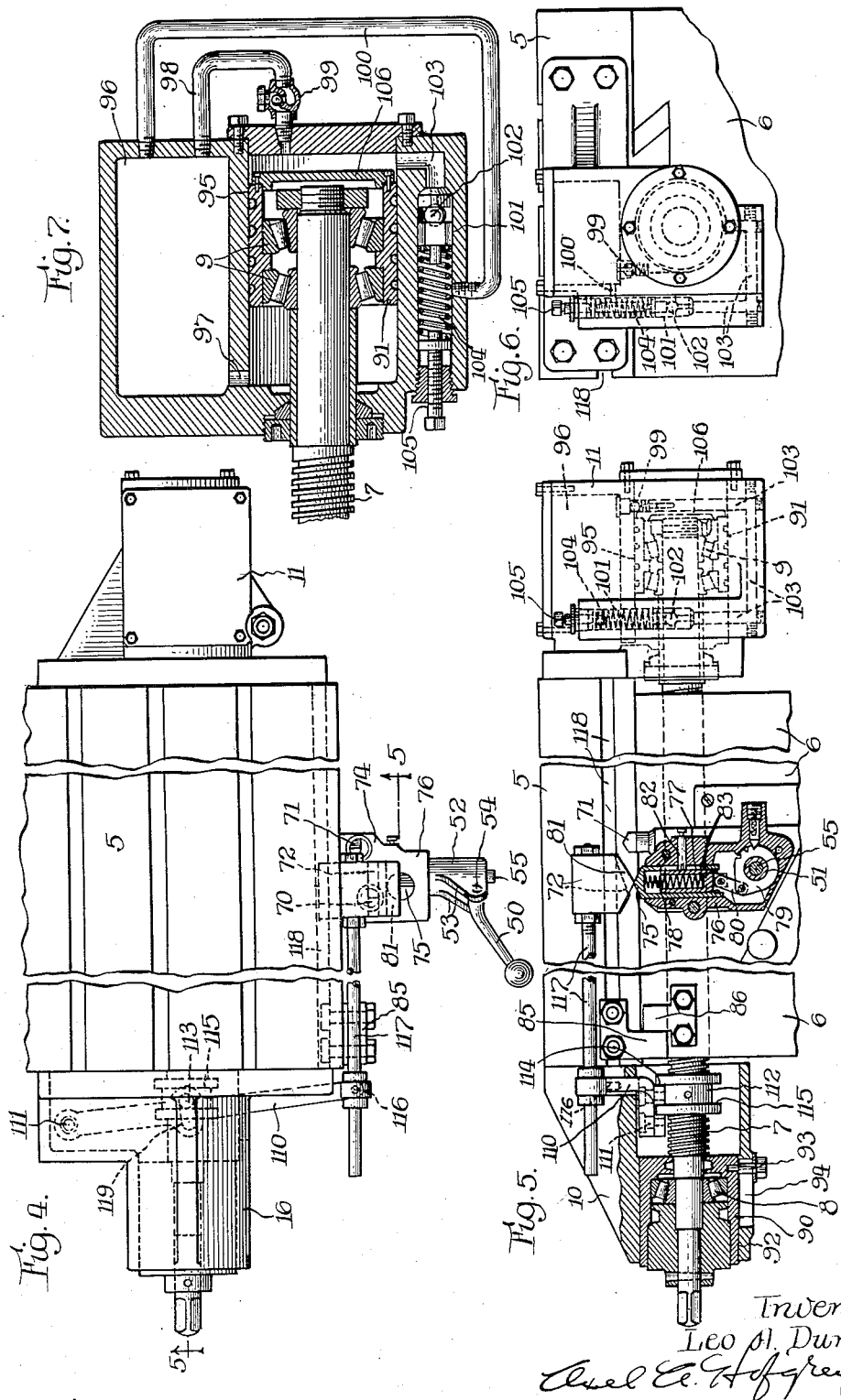
Inventor:
Leo A. Dumser, Patented July 17, 1934

1,966,888

UNITED STATES PATENT OFFICE 1,966,888

MACHINE TOOL

Leo A. Dumser, Rockford, Ill., assignor to Sundstrand Machine Tool Co., Rockford, Ill., a corporation of Illinois Application March 5, 1931, Serial No. 520,308

22 Claims. (Cl. 90—21)

This invention relates generally to machine tools, and more particularly to actuating mechanisms for movable supports for machine tools.

It is the general object of the invention to provide a novel actuating mechanism for tool or work supports embodying means whereby the support may be stopped accurately and positively at a predetermined point in its travel, and after a time interval reversed and returned.

Another object is to provide such an actuating mechanism embodying mechanical means for moving a support, together with auxiliary means for obtaining a dwell in the movement of the support while the mechanical means continues to operate.

Another object is to provide, in combination with a positive actuating mechanism for a movable support, hydraulic means positioned serially in said mechanism so as to permit a dwell in the movement of the support, while the positive means continues to operate, thereby permitting the support to be engaged with a positive stop for accurately determining the movement thereof.

Another object is to provide an actuating mechanism for a movable support, together with control means operable while the table is stopped and functioning after a time interval to cause a reverse movement of the support.

Further objects of the invention will become apparent from the following detailed description taken in connection with the accompanying drawings, in which:

Fig. 4 is an enlarged fragmentary plan view of Fig. 1.

Fig. 5 is a fragmentary front elevation thereof partly in section along the line 5—5 of Fig. 4, showing the position of the parts when the feed-traverse clutch has just been actuated to return the table.

Fig. 6 is a fragmentary elevation looking at the right-hand end of Figs. 4 and 5.

Fig. 7 is a section illustrating the hydraulic circuit somewhat diagrammatically.

Figure 1:
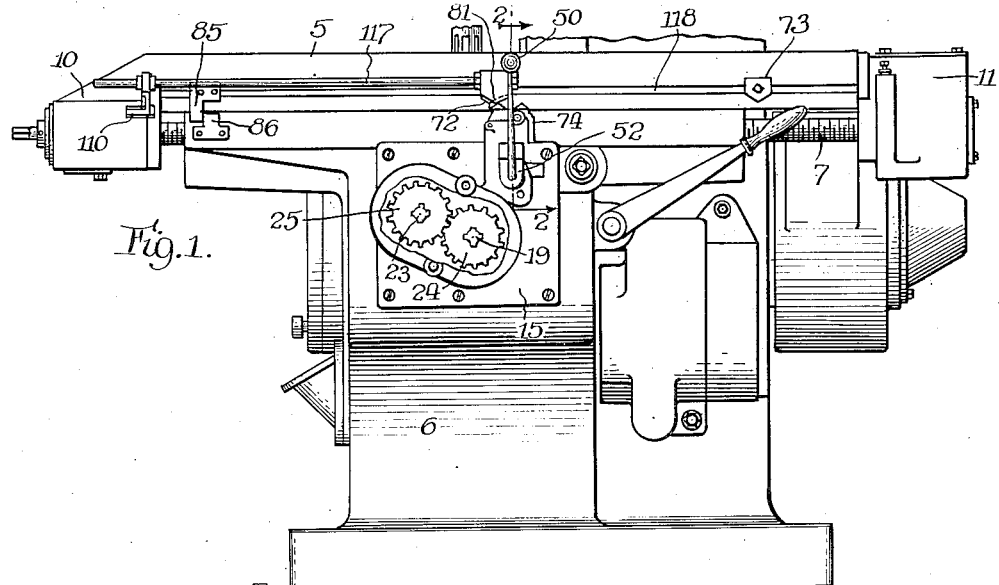
Fig. 1 is a fragmentary front elevation of a preferred form of the invention embodied in a milling machine.

While my invention is susceptible of embodiment in many different forms, I have shown in the drawings and shall herein describe in detail one such embodiment incorporated in a milling machine, with the understanding that the present disclosure is to be considered as an exemplification of the principles of the invention and is not intended to limit the invention to the embodiment illustrated. The scope of the invention will be pointed out in the appended claims.

As illustrated in the drawings, the exemplary form of the invention is shown in connection with a milling machine work support or table 5 which is mounted for reciprocatory movement on a base or bed 6. These parts are shown somewhat similar to the construction illustrated and described in United States Letters Patent No. 1,912,033, issued May 30, 1933 on an application Serial No. 160,039, filed on January 10, 1927, by Charles B. De Vlieg, the support 5 being provided with a feed screw 7 rotatably mounted thereon by means of bearings 8 and 9 (Fig. 5) which are supported in brackets 10 and 11 secured to the opposite ends of the support. Intermediate its ends the feed screw 7 is threaded through a stationary nut 12 (Fig. 3) mounted in the base 6 so that by rotating the feed screw in reverse directions the support 5 may be reciprocated.

As shown in the exemplary embodiment of the invention, means is provided to drive the work support 5 at feed and traverse speeds in opposite directions. This means comprises generally reversing and feed-traverse gearing connected to the feed screw 7 and housed in a transmission casing 15 which is mounted in the forward portion of the bed 6, and a table drive shaft 16 which is adapted to be geared to the main drive shaft of the machine and to the mechanism in the casing 15, for transmitting motion therebetween.

Figure 3:
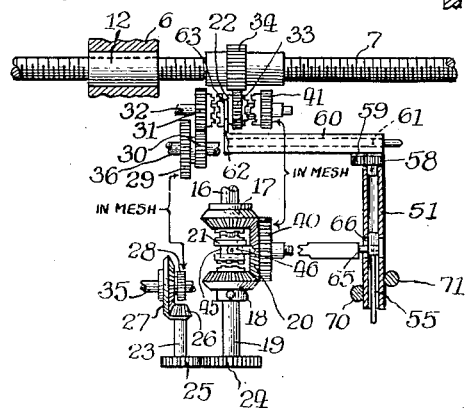
Fig. 3 is a diagrammatic view of the gearing in the work table transmission casing.

The forward end of table drive shaft 16 enters the casing 15 and, as illustrated most clearly in Fig. 3, has journaled thereon a bevel gear 17 of a reversing device. This reversing device comprises also a corresponding bevel gear 18 secured to a short shaft 19 journaled in the casing in axial alinement with the shaft 16, an intermediate bevel gear 20 journaled for rotation at right angles to the gears 17 and 18 and meshing therewith, and a shiftable clutch member 21 which is slidably mounted on and splined to the drive shaft 16.

The table feed screw 7 is arranged to be driven through the reversing device at a traverse rate suitable for shifting the table 5 most efficiently through the rapid approach and return or non-cutting movements, or at a slow or feed rate suitable for cutting operations, by means including a feed-traverse clutch member 22 (Fig. 3) which is operable to shift from one drive to the other. The means to impart a feed movement to the table from the shaft 16 comprises, as illustrated herein, a short shaft 23 journaled in the front wall of the casing 15 parallel to the shaft 19, pick-off gears 24 and 25 on the forward ends of shafts 19 and 23, respectively, bevel gears 26 and 27, spur gears 28, 29, 30 and 31, and a non-rotatable shaft 32 extending transversely of the casing 15 and parallel to the feed screw 7. The clutch member 22 is journaled on this shaft 32 and has a spur gear 33 formed integrally therewith which meshes continuously with a spur gear 34 splined on the feed screw. The bevel gear 26 is secured to the rear end of the shaft 23. The gears 27, 28, 29 and 30 are preferably double-gears journaled upon bearing pins or shafts 35 and 36 mounted transversely in the casing.

The gear 33 which is herein disclosed as journaled upon the shaft 32 is provided with axially extending clutch teeth adapted to engage with corresponding teeth on the clutch member 22. The clutch member is adapted to be slid axially of the shaft into and out of engagement with the clutch teeth on the gear.

The traverse drive means to the table comprises a spur gear 40 secured to the beveled gear 20, and a spur gear 41 which is journaled upon the shaft 32 and has axially extending teeth adapted to engage corresponding teeth on the other end of the shiftable clutch member 22. Thus the clutch member 22 may be shifted to engage either the feed gear 31 or the traverse gear 41, or may be placed in a neutral non-engaging position intermediate the two gears.

The reversing clutch member 21, as illustrated herein, has an annular groove 45 (Fig. 3) therein which is arranged to be engaged by an actuating member 46 hereinafter more fully described. When moved into engagement with the bevel gear 17 the clutch member locks the bevel to the shaft 16. This connection drives the spur gear 40 through the bevel gears 17 and 20; and drives the short shaft 19 through all three bevel gears in a direction opposite to that of the drive shaft 16. When the clutch member is slid in the opposite direction and is engaged with the bevel gear 18, it constrains that gear (and thus the short shaft 19) to rotate with the shaft 16, the spur gear 40 being driven through the bevel gears 18 and 20. The bevel gear 17 then rotates freely upon the shaft 16 in a direction opposite to that of the shaft. Thus the spur gear 40 and the short shaft 19 may be reversed simultaneously by means of the clutch member 21 and may be left idle by placing the clutch member in a neutral position intermediate the bevel gears.

The movements of the work table 5 are, as illustrated herein, controlled manually by means of a single control lever 50 which is connected to the reversing clutch member 21 and also to the feed-traverse clutch member 22.

Referring particularly to Figs. 2 to 5, the lever 50 is carried upon a sleeve 51 which is rotatably mounted in the front wall of the casing 15. At its forward end this sleeve carries a member 52 with a pair of spaced lugs 53 projecting upwardly therefrom the lever being pivotally mounted intermediate its ends on a pin 54 positioned between said lugs so as to be capable, when actuated, of oscillating the sleeve 51 about its axis. The lever 50 is also arranged to actuate a plunger 55 which is slidable axially in the bore of the sleeve 51 and for this purpose the lower end 56 (Fig. 2) of the lever is engaged in a notch 57 in the plunger. Thus by pivoting the lever about the axis of the sleeve 51 the plunger 55 is not moved, and by pivoting the lever about the pivot pin 54 the plunger may be actuated independently of the sleeve.

As illustrated herein, the oscillatory movement of the sleeve 51 is utilized to operate the feed-traverse clutch member 22 and the reciprocatory movement of the plunger 55 is arranged to operate the reversing clutch member 21. A spur pinion 58 (Figs. 2 and 3) secured to the inner end of the sleeve 51 is arranged to engage a rack 59 fixed on a reciprocable clutch actuating member 60. This clutch actuating member is slidably mounted upon a pin 61 bolted to the side wall of the transmission casing 15 and is provided with a projecting finger 62 which extends into a peripheral slot 63 in the feed-traverse clutch member 22. Thus upon rotating the sleeve 51 by means of the control lever 50 the pinion 58 actuates the clutch shifting member 60 through the rack 59.

In the exemplary embodiment of the invention the plunger 55 is connected to the actuating member 46 for the reversing clutch 21 by means comprising a radially projecting pin 65 (Fig. 3) which pin extends through an H-slot 66 in the sleeve 51 and engages the reversing clutch actuating member 46 which is slidably mounted for movement parallel to the axes of the plunger 55 and clutch member 21.

The gearing between the feed drive shaft 16 and the feed gear 31, and between the shaft 16 and the quick-traverse gear 41 is such that the gears 31 and 41 always rotate in opposite directions. This arrangement, when the reversing and feed-traverse clutches are positioned to feed the table forward (to the right as shown in Fig. 1), permits the operator to cause a quick-traverse movement of the table in the reverse direction (to the left in Fig. 1) merely by shifting the feed-traverse clutch member 22.

Means is also provided to shift the clutch member 22 from feed to traverse automatically at the end of a cutting stroke so as to return the table at a rapid return or traverse rate. This means is adapted to be operated by dogs to rotate the sleeve 51 and in its preferred form comprises plungers 70 and 71 having rack and pinion connections with the opposite sides of the sleeve 51 so that when the table is feeding and the plunger 70 is actuated by a dog 72 mounted upon the table 5 the clutch member 22 is disengaged from the feed gear 31, and when the table is returning rapidly and the plunger 71 is actuated by a dog 73 on the table the clutch member 22 is disengaged from the traverse gear 41. The plungers 70 and 71 are slidably mounted in bores in a projecting portion 74 of the casing 15 and are provided with rack teeth thereon which mesh with pinion teeth on the sleeve.

Figure 2:
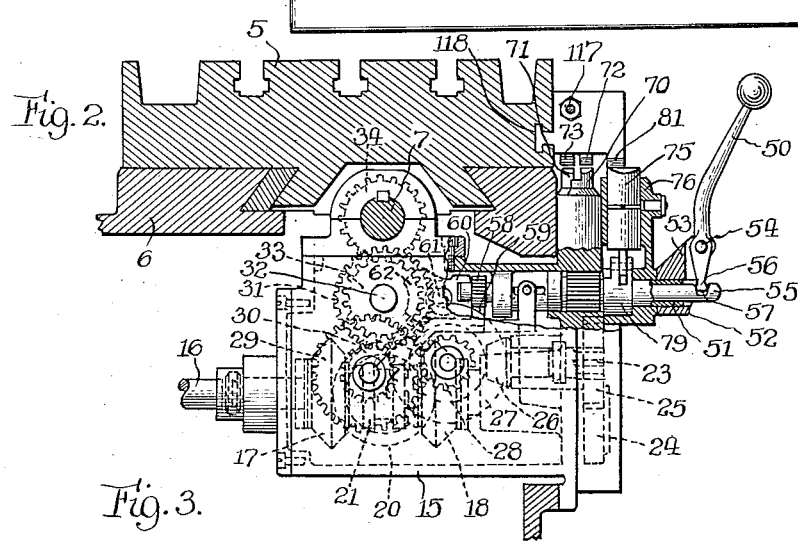
Fig. 2 is an enlarged fragmental elevation partly in section along the line 2—2 of Fig. 1.

To complete the shift of the feed-traverse clutch member 22 from the feed gear 31 through neutral and into engagement with the quick-traverse gear 41, for returning the table automatically, a second dog actuated shift device is provided. This device, as illustrated in Figs. 2, 4 and 5, comprises a hollow plunger 75 slidable vertically in a block 76 secured to the portion 74 of the casing 15. A hollow piston-like member 77 is positioned in the bore of the plunger 75, a compression spring 78 being inserted between the adjacent sides of the end walls of the plunger and piston so as normally to force the members apart. The piston is connected to an eccentric portion of a collar 79 secured to the sleeve 51 by means of a link 80 which is pivoted at its opposite ends to the said collar and to a bifurcated lug formed integrally with the piston 77.

The upper end of the hollow plunger 75 is provided with cam surfaces adapted to be engaged by a dog 81. A pin 82 is preferably mounted on the casing portion 74 and extends into a longitudinal slot 83 in the plunger 75 to limit the upward movement of the plunger and to prevent the plunger from rotating.

With the clutch member 22 engaged with the feed gear 31 and the table 5 moving toward the right (Figs. 1, 4 and 5) the plungers 70 and 75 are raised. When the dogs 72 and 81 engage the plungers 70 and 71, the dog 81 depresses the hollow plunger 75, thereby compressing the spring 78, and the dog 72 depresses the plunger 70, which in turn rotates the sleeve 51 to disengage the clutch member 22 and move it to its neutral position. This rotation of the sleeve 51 by the plunger 70 raises the piston 77 and further compresses the spring 78. However, as soon as the sleeve 51 has turned so that the link 8 has passed the dead center line between the axis of the sleeve 51 and the end of the piston, the spring 78 pressing downwardly on the piston causes the sleeve 51 to shift through neutral position and into the quick-traverse position. The table 5 then moves at a traverse rate to the left at the end of the return travel of the table.

In its preferred form, the means whereby the table may be stopped accurately and positively at a predetermined point in its travel and, after a time interval, reversed and returned, comprises a positive stop member or abutment 85 adjustably secured to the table 5, and a cooperating abutment 86 secured to the bed 6, and dwell means interposed in serial relation with the mechanical actuating means. The means in serial relation with the mechanical actuating means is herein connected between the feed screw and the table and is shown in the form of means adapted to permit the feed screw 7 to continue to rotate after the table has been stopped and a control mechanism which is adapted to actuate the table control means after the table has stopped.

As illustrated most clearly in Figs. 5 and 7, the bearings 8 and 9 for the feed screw are slidably supported for movement longitudinally of the table on pistons 90 and 91. The piston 90 is positioned in a bore 92 in the bracket 10 and is adapted to be held against turning by means of a guide member 93 which is secured to the piston and extends through a longitudinal slot 94 in said bracket. The piston 91 is slidably mounted in a cylinder 95 formed in the bracket 11 beneath a reservoir 96 which is adapted to contain a fluid such as oil.

Fluid is admitted from said reservoir to one end of the cylinder 95 by means of a conduit 97, and is admitted from the reservoir to the other end of the cylinder 95 by means of a conduit 98 which has a check valve 99 therein. This check valve is arranged to pass fluid into the cylinder but to prevent fluid from flowing out of that end of the cylinder through the conduit. A second conduit 100 is connected with the reservoir 96 (Fig. 7), and communicates with a recess 101 which contains a pressure relief valve 102 and is connected to the cylinder 95 by means of a conduit 103. Said relief valve 102 is normally held in a closed position by means of a spring 104, the tension of which is adjustable by means of a screw device 105.

It will be apparent that when the feed screw 7 is rotated to move the table 5 toward the left (Figs. 1, 4, 5 and 7) the piston 91 will first move freely toward the left in the cylinder 95, pressure fluid to the left of the piston passing back into the reservoir through the conduit 97 and pressure fluid filling the cylinder to the right of the piston through the conduit 98. Passage of fluid through the piston 91 is prevented by means of a suitable closure 106 secured to the right-hand end thereof (Fig. 7). When the piston 91 reaches the left-hand end of the cylinder 95, the table will be moved to the left, which movement in the present embodiment of the invention is a rapid return or non-cutting movement with the clutch 22 in engagement with the traverse gear 41. The control plunger 71 is then raised and in position to be engaged by the dog 73 to stop the table.

The reservoir 96, together with the port 97, conduits 98 and 100, recess 101 and port 103, comprises a means forming a passage connecting the opposite ends of the cylinder which passage embodies means for permitting flow of fluid in one direction, for normally preventing the flow of fluid in a reverse direction, and for permitting such reverse flow of fluid when the pressure exceeds a predetermined amount. Upon reversal of the feed screw 7 to move the table toward the right, the pressure fluid to the right of the piston 91 is prevented from escaping through the conduit 98 by the check valve 99, and is prevented from escaping through the conduit 100 by the relief valve 102 which is set to operate at a higher pressure than that existing in the cylinder 95 during the normal feed or cutting movement of the table. When, however, the table reaches the end of its cutting stroke and the positive stop 85 engages the abutment 86, the pressure in the cylinder 95 will rise above the setting of the relief valve 102, with the result that the valve will open to exhaust pressure fluid through the conduit 100. Thus the mechanical feed mechanism continues in operation while the table is stopped, the pistons 90 and 91 sliding to the right in the cylinders 92 and 95.

In order to disengage the feed-traverse clutch 22 while the table remains stationary and the feed screw 7 continues in operation, the invention provides a novel mechanism for actuating the plungers 70 and 75. As illustrated herein, this mechanism comprises a lever 110. (Figs. 1, 4 and 5) pivotally mounted at one end on a pin 111 secured to the bracket 10 and connected intermediate its ends to a collar 112 which is pinned on the feed screw 7. As shown in the drawings, the lever 110 is connected to the collar 112 by means of a pin 113 which is slidably mounted in an arcuate slot 119 in the lever and carries a roller 114 engaging an annular groove 115 in said collar. The free end of the lever 110 is pivotally connected by a pin 116 to one end of a rod 117 which extends longitudinally in front of the table 5. This rod is supported at its other end by the dog 72 which is slidably mounted in a T-slot 118 (Figs. 2, 4 and 5) along the front edge of the table. As illustrated herein, the dog 81 is formed integrally with the dog 72 which is provided with a T-portion slidably fitted into the T-slot.

Assuming that the feed-traverse and reversing clutches will be shifted manually by means of the control lever 50 for the purpose of obtaining a rapid approach movement of the table 5 toward the right, and also that the said clutches will be actuated manually again to stop the rapid approach movement and cause a feed movement of the table to the right, the table will then feed until the stop member 85 engaging the abutment 86 whereupon the table will be accurately and positively stopped. The plungers 70 and 75 will then be in their raised positions, and during continued operation of the feed screw by the mechanical feed-traverse mechanism the valve 102 will permit fluid to flow reversely from the right-hand end of the cylinder (Figs. 1, 5 and 7 through the reservoir 96 and into the left-hand end of the cylinder. During this continued rotation of the feed screw the collar 112 actuates the lever 110 and after a predetermined time interval causes the dogs 72 and 81 to depress the plungers 70 and 75 so as to shift the feed-traverse clutch from its feed position to its traverse position. This causes a reverse movement of the feed screw and also the table 5 at a rapid traverse rate, the initial movement of the feed screw causing the piston 91 to move toward the left in the cylinder 95 until it engages the end thereof. During this relative movement of the piston and cylinder, fluid is permitted to pass freely from the left-hand end of the cylinder to the right-hand end. Continued operation of the feed screw moves the table 5 until the dog 73 engages the plunger 71, whereupon the feed-traverse clutch is disengaged and the table is stopped.

It is believed apparent from the foregoing that the invention provides an effective means whereby a mechanically actuated movable support may be limited in its movement to a precision degree. Furthermore the invention provides simple and effective means for operating the control device after the support has been stopped in order to obtain an automatic reversal of movement.

I claim as my invention:

1. In a machine tool, in combination, a frame member, a movable member on said frame member, means for reciprocating said movable member including a rotatable element mounted on one of said members and disengageable driving means therefor, means for controlling said reciprocating means embodying a trip device movably mounted on said frame member adjacent the front edge of the movable member, means adapted positively to limit the movement of the movable member in one direction, means for mounting one of said elements on its supporting member comprising a piston and cylinder device one part of which is secured to said element and the other to said member, means establishing communication between the opposite ends of the cylinder embodying a valve for permitting flow of fluid in one direction, and normally preventing flow of fluid in a reverse direction so as to cause the piston and cylinder to move together, and operable to pass fluid in the reverse direction when the pressure exceeds a predetermined amount to permit the piston to move in the cylinder, a trip dog movably mounted on said movable member adapted to actuate said trip device to disengage said reciprocating means, and means operable during relative movement of the piston and cylinder to cause said dog to actuate said trip device.

2. In a machine tool, in combination, a frame member, a movable member on said frame member, means for reciprocating said movable member including a driven element mounted on one of said members, means for controlling said reciprocating means embodying a trip device, means adapted positively to limit the movement of the movable member in one direction, means for mounting said driven element on its supporting member comprising a piston and cylinder device one part of which is secured to said element and the other to the supporting member, means establishing communication between the opposite ends of the cylinder embodying a valve for permitting flow of fluid in one direction, and normally preventing flow of fluid in a reverse direction so as to cause the piston and cylinder to move together, and operable to pass fluid in the reverse direction when the pressure exceeds a predetermined amount to permit the piston to move in the cylinder, a trip dog movably supported on one of said members and adapted to actuate said trip device to disengage said reciprocating means, and means operable when the movable member is stationary and during relative movement of the piston and cylinder in the reverse direction to cause said dog to actuate said trip device.

3. In a machine tool, in combination, a frame member, a movable member on said frame member, means for reciprocating said movable member including a rotatable element mounted on one of said members, means for controlling said reciprocating means embodying a trip device mounted on said frame member adjacent the front edge of the movable member, means adapted positively to stop the movement of the movable member in one direction, means for mounting one of said elements on its supporting member comprising two parts, one of which is secured to said element and the other to said member, means for permitting relative movement of said parts in one direction, and normally preventing relative movement of said parts in the reverse direction so as to cause the parts to move together, and operable to permit relative movement in the reverse direction when the movable member is positively stopped, a trip dog movably mounted on said movable member adapted to actuate said trip device to disengage said reciprocating means, and means operable by relative movement of said parts to cause said dog to actuate said trip device.

4. In a machine tool, in combination, a frame member, a movable member on said frame member, mechanical means for reciprocating said movable member including a rotatable element mounted on one of said members, means for mounting said element on its supporting member comprising a piston and cylinder device one part of which is secured to said element and the other to said member, means establishing communication between the opposite ends of the cylinder embodying a valve for permitting flow of fluid in one direction, and normally preventing flow of fluid in a reverse direction so as to cause the piston and cylinder to move together, and operable to pass fluid in the reverse direction when the pressure exceeds a predetermined amount to permit the piston to move in the cylinder.

5. In a machine tool, in combination, a frame member, a movable member on said frame member, means for reciprocating said movable member including a movable element mounted on one of said members, means for mounting said element on its supporting member comprising a piston and cylinder device one part of which is secured to said element and the other to said member, means establishing communication between the opposite ends of the cylinder for passing fluid in one direction and permitting relative movement of the piston and cylinder, means normally preventing flow of fluid in a reverse direction so as to cause the piston and cylinder to move together, and means operable to pass fluid in the reverse direction when the pressure exceeds a predetermined amount to permit the piston to move reversely in the cylinder.

6. In a machine tool, in combination, a frame element, a support movably mounted thereon, mechanical means for reciprocating said support comprising a first member mounted on said base, and a second member carried on said support, means connecting said second member to said support comprising a piston and cylinder device, one element of which is secured to said second member, and the other element of which is secured to said support, means for supplying fluid to both ends of said piston and cylinder device, means for preventing the exhaust of fluid from one end of said cylinder, and means for permitting exhaust of fluid from said one end of the cylinder when the pressure reaches a predetermined maximum.

7. In a machine tool, in combination, a base, a table slidably mounted on said base, mechanical means for reciprocating said table comprising a first member mounted on said base and a second member carried on said table, means for controlling said reciprocating means including a trip device mounted on said base adjacent the front edge of the table, means for mounting said second member on said table for movement longitudinally thereof, means for preventing movement of said second member longitudinally of said table in one direction, a positive stop device on said table adapted to engage an abutment on said base for limiting movement of the table in one direction, means operable to permit movement of said second member longitudinally of the table when said stop device engages said abutment, and means operable a predetermined time interval after the table has stopped for actuating said trip device to reverse the table.

8. In a machine tool, in combination, a support, a table movably mounted thereon, mechanical means for actuating said table comprising a first member mounted on said support, a second member mounted on said table, and means for actuating one of said members, means intermediate one of said members and the element upon which it is mounted providing for a movement of said one member relative to said element longitudinally of the table comprising a piston and cylinder device one part of which is secured to said one member and the other to said element, means for supplying a fluid to said cylinder, means for preventing the escape of fluid from one end of the cylinder so as to cause said table to move with said one member, mechanical means for positively limiting the movement of the table in one direction, and means operable when the table is stopped by said mechanical means to permit fluid to exhaust from said cylinder and thereby permit a relative movement between said one member and said table.

9. In a machine tool, in combination, a support, a table slidably mounted thereon, means for reciprocating said table comprising a feed screw rotatably mounted on the table, a nut secured to the support, and means for reversibly rotating said feed screw, means for mounting said screw on said table for movement longitudinally thereof, means for positively limiting the movement of the table in one direction, and means driven by said screw after the table has stopped for automatically reversing the movement of the table.

10. A machine tool comprising, in combination, a reciprocating member, a stationary member supporting said reciprocating member, a threaded element, a second element in threaded relation with said threaded element, one of said elements being non-rotatably secured to one of said members and the other of said elements being rotatably secured to the other member, a power driven feed-traverse transmission for actuating said rotative element, means intermediate said rotative element and the member on which it is mounted arranged to permit longitudinal movement therebetween, means for preventing such longitudinal movement during an advance stroke of said reciprocating member, means for stopping said reciprocating member when moving in one direction without interrupting said feed-traverse transmission, and means operable when the reciprocating member has been so stopped to permit relative longitudinal movement of said rotative element with respect to its supporting member.

11. A mechanism of the character disclosed comprising, in combination, a reciprocating support, actuating mechanism therefor including a feed screw mounted thereon, a control device effective to determine the operation of said mechanism, a dog slidably mounted on said support adapted to shift said control device, a lever having one end pivotally mounted on said support, means connecting the free end of said lever to said dog, and means connecting the intermediate portion of said lever to said feed screw.

12. In a machine tool, in combination, a frame element, a support slidably mounted thereon, mechanical means for reciprocating said support at feed and traverse rates, an abutment on said frame element, a stop member adjustably secured to said support and arranged to engage said abutment positively to limit the movement of the support in one direction, means enabling said mechanical means to continue in operation after the support has been stopped by said abutment, and means for disengaging said mechanical actuating mechanism a predetermined time interval after the support has been stopped comprising a trip device for said mechanical means, a dog arranged to actuate said trip device slidably mounted on said support, and means operable by said mechanical means for moving said dog to engage said trip device.

13. In a machine tool, in combination, a support, a table slidably mounted on said support, means for moving said table comprising a feed screw mounted on the table and a nut mounted on said base, means for positively limiting the movement of the table in one direction, and means securing said feed screw to the table against movement longitudinally of the table when the table is moving and operable to permit movement of the feed screw longitudinally of the table when the movement of the table is limited by said means.

14. In a machine tool, in combination, a base, a movable support on said base, means for reciprocating said support including a feed screw rotatably mounted on said support, means for controlling said reciprocating means, an abutment on said base, a stop device adjustably secured to said support adapted to engage with the abutment positively to limit the movement of the support in one direction, means for rotatably mounting said feed screw on said support comprising a piston secured to one end of said feed screw, a cylinder for said piston secured to one end of said support, a fluid reservoir movable with the support, a port from said reservoir to one end of said cylinder, means establishing communication between said reservoir and the other end of the cylinder embodying a check valve for preventing flow of oil out of the cylinder, a second means establishing communication between said reservoir and said other end of the cylinder, and an adjustable pressure relief valve operable to permit oil to flow from the cylinder back to the reservoir through said second means.

15. In a machine tool, in combination, a base, a movable support on said base, means for reciprocating said support including a feed screw rotatably mounted on said support, means for controlling said reciprocating means embodying a trip device mounted on said base adjacent the front edge of the support, an abutment on said base, a stop device adjustably secured to said support adapted to engage with the abutment positively to limit the movement of the support in one direction, means for rotatably mounting said feed screw on said support comprising a piston secured to one end of said feed screw, a cylinder for said piston secured to said support, a fluid reservoir positioned above said cylinder and movable with the support, a port from said reservoir to one end of said cylinder, means establish communication between said reservoir and the other end of the cylinder embodying a check valve for preventing flow of fluid out of the cylinder, a second means establishing communication between said reservoir and said other end of the cylinder, an adjustable pressure relief valve operable to permit fluid to flow from the cylinder back to the reservoir through said second means, a lever having one end pivotally mounted on said support and extending substantially transversely thereof, a collar on said feed screw, means connecting said collar to said lever intermediate its ends, a rod slidably mounted on the front of said support carrying a dog adapted to actuate said trip device, and means securing the free end of said lever to said rod.

16. In a machine tool, in combination, a support, a member slidably mounted thereon, means for reciprocating said member comprising a feed screw rotatably mounted on the member, a nut secured to the support, means for rotating said feed screw, means for mounting said screw on said member for movement longitudinally thereof comprising a piston and cylinder device, a hydraulic circuit connected to the opposite ends of said cylinder and embodying means for controlling the transfer of fluid from one end to the other, means for positively limiting the movement of the member in one direction when said screw is rotated, and means driven by said screw after the member is stopped for automatically reversing the movement of the member.

17. A machine tool having, in combination, a support, a member movably mounted on said support, mechanical mechanism for reciprocating said support including an element carried on the support, and means for securing said element to the support comprising a piston and cylinder device, one part of which is secured to the element and the other to the support, means normally preventing movement of said piston in said cylinder during movement of the support in one direction, means for positively limiting the movement of the support in said one direction, and means operable during continued actuation of said element by said mechanism to permit said piston to move in said cylinder.

18. A machine tool having, in combination, a reciprocatory support, gearing for reciprocating said support, a lost motion means in serial relation with said gearing comprising a piston and cylinder device, means for locking said piston and cylinder against relative movement during movement of the support and effective to permit such relative movement between the piston and cylinder if the support is stopped while the gearing continues in operation, means for positively limiting the movement of the support in one direction while said gearing continues to operate, and means operable after the support has been stopped a predetermined interval of time to reverse said gearing and return the support.

19. A machine tool having, in combination, a reciprocatory support, actuating mechanism for the support embodying mechanical gearing for moving the support, auxiliary means in serial relation with said mechanical gearing for obtaining a dwell in the movement of the support while the mechanical gearing continue to operate comprising relatively movable parts, means for locking said parts together to render the actuating mechanism effective to move said support, and gearing operable automatically to cause a return movement of the support after such a dwell.

20. A machine tool having, in combination, a reciprocatory support, positively acting mechanical gearing for reciprocating said support, hydraulic means positioned serially in said gearing and having parts locked together during movement of the support, which parts are relatively movable when the support is stopped so as to permit a dwell in the movement of the support while the gearing continues to operate, and means for definitely limiting the movement of the support in one direction so as to cause said hydraulic means to function.

21. A machine tool having, in combination, a reciprocatory support, mechanical gearing for reciprocating said support including a lost motion device in serial relation having a first part and a second part, means for preventing relative movement of said parts during movement of said support effective to permit movement between said parts when the support is stopped, and control means for said gearing operable while the support is stopped and functioning after a time interval to cause a reverse movement of the support.

22. A machine having, in combination, a movably mounted support, means for actuating the support including a piston and cylinder device, means for preventing movement of the piston in the cylinder during movement of the support, operable to permit movement of the piston in the cylinder when the support is stopped.

LEO A. DUMSER.

CERTIFICATE OF CORRECTION.

Patent No. 1,966,888. July 17, 1934.

LEO A. DUMSER.

It is hereby certified that error appears in the printed specification of the above numbered patent requiring correction as follows: Page 6, line 106, claim 19, for "continue" read continues; and line 110, for "gearing" read means; and that the said Letters Patent should be read with these corrections therein that the same may conform to the record of the case in the Patent Office.

Signed and sealed this 11th day of September, A. D. 1934.

Leslie Frazer (Seal)

Acting Commissioner of Patents.